United States Patent
Westerlund et al.

[15] 3,705,737
[45] Dec. 12, 1972

[54] PIPE COUPLING WITH RELEASABLE CONNECTOR

[72] Inventors: Robert E. Westerlund, Mequon; Herbert A. Westerlund, Port Washington, both of Wis.

[73] Assignee: Construction Forms, Inc., Cedarburg, Wis.

[22] Filed: April 23, 1971

[21] Appl. No.: 136,682

[52] U.S. Cl.....................................285/365, 24/271
[51] Int. Cl................................................F16l 17/00
[58] Field of Search ........24/270, 271, 272; 285/365, 285/409

[56] References Cited

UNITED STATES PATENTS

| 2,775,806 | 1/1957 | Love | 24/271 |
| 2,846,244 | 8/1958 | Porker | 285/409 |
| 3,181,901 | 5/1965 | Watts | 285/367 |

FOREIGN PATENTS OR APPLICATIONS

| 977,205 | 12/1964 | Great Britain | 285/365 |

Primary Examiner—Dave W. Arola
Attorney—Andrus, Sceales, Starke & Sawall

[57] ABSTRACT

A coupler unit includes two hemispherical sections having a U-shaped cross-section and opposed radial end faces. A hinge pin connects the one end of the sections with a selected spacing between the opposing faces. A toggle assembly connects the opposite ends and includes a bolt, pivotally attached to a first section and having an outer nut pivotally connected to a handle which extends over the adjacent section. The handle includes an integral cam end corresponding to a cam surface on the second section to provide a cam action in response to engagement and pivotal movement of the handle. An operating handle extends over the coupler sections with a central integrally formed enlargement extending inwardly between a pair of walls with the enlargement resting on the section. The enlargement and walls have aligned openings to receive a locking pin.

9 Claims, 4 Drawing Figures

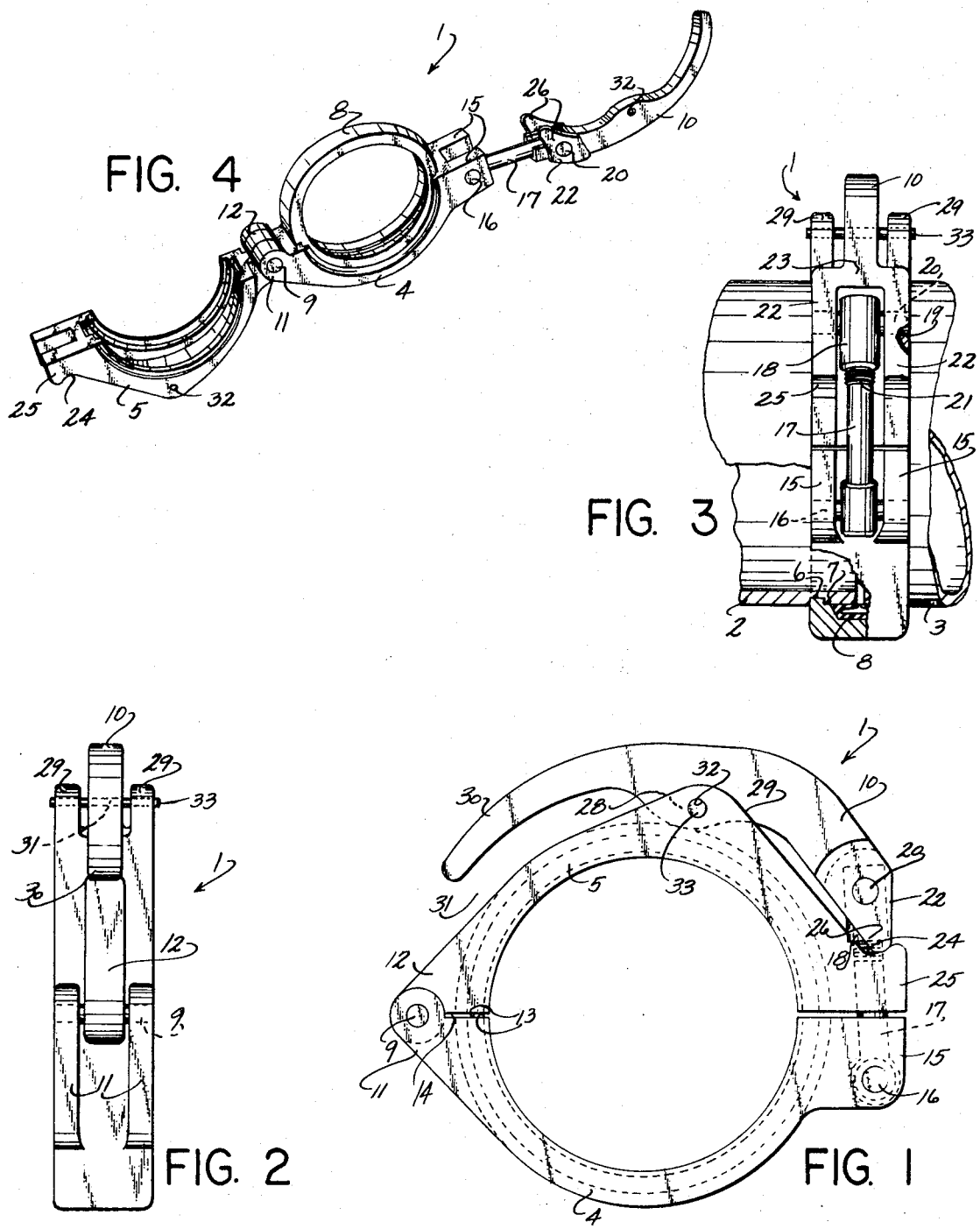

PIPE COUPLING WITH RELEASABLE CONNECTOR

BACKGROUND OF INVENTION

This invention relates to a conduit coupling unit with a releasable toggle joint and particularly such a coupling unit for interconnecting of a pair of pipe sections in axially end-to-end relationship.

In many flow systems, the pipes or other conduit means may be more or less temporarily interconnected for relatively short periods of time to provide a particular transfer of material. One relative recent development requiring the connection and disconnection of conduit flow sections has been concrete pumping wherein the concrete is trucked to the installation site and then transferred to the actual drop location through a pressurized pumping system. As each installation is generally unique, the pumping system employs standarized pipe sections which are releasably connected to produce the most convenient transfer path. Such systems require relatively high pressure transfer to adequately move the material, and the interconnecting joint preferably provides a fluid and liquid tight seal between the adjacent pipe sections. Further, in most applications, each joint is preferably through a coupling which will permit rapid closing and opening to permit reassembly of the pipe sections as well as an initial assembly and disassembly in a relatively rapid manner. Various toggle joint pipe couplings have been suggested in the prior art. For example, Hughes U.S. Pat. No. 2,752,174 discloses a hinged pipe coupling having a toggle connection for releasing and completing the opening and closing of the coupling. A similar type coupling is shown in U.S. Pat. No. 3,113,791. Although such hinged toggle couplings have been employed, they have not included convenient opening and closing, the teaching of the prior art being particularly directed to maintaining a tight, reliable closure. Thus, the toggle lever members of the prior art establish a relatively high closing pressure with the lever handle lying immediately adjacent to the pipe section. To open such toggle couplings, generally a screwdriver or similar tool is employed to initially apply an additional leverage to the end of the handle to permit manual opening of the unit. Further, the prior art coupling units have generally been formed with similar hemispherical sections hinged at one end and releasably connected at the opposite end. The opposed mating faces particularly at the hinge are specially formed to provide an interengagement to produce a fulcrum type effect to increase the closure pressure. Such systems thus stress the hinged joint in order to establish a very firm tight joint closure. However, Applicants realize that particularly in concrete placement applications the introduction of foreign matter between the surfaces will adversely affect the sealing characteristic and pressures of the coupling unit.

SUMMARY OF THE INVENTION

The present invention is particularly directed to a multiple piece or segmental band type coupling unit for a conduit means having a manually operated toggle release which will permit a firm and reliable closure while maintaining convenient manual actuation of the unit and particularly the opening thereof.

Generally in accordance with the present invention, the coupling unit is formed as a multiple segment coupling members defining a circular joint enclosure and preferably having two similar generally hemispherical members hinged to each other at the opposite end by a lever operated releasable toggle connector. In accordance with the teaching of the present invention, the toggle connector includes a pivotally mounted handle forming a part thereof which in the closed position is constructed to curve about the pipe section and coupling unit substantially in excess of one quarter of the circumference thereof. The central portion of the handle is specially constructed to cooperate with an adjacent coupling member and in particular to provide for an interrelated spacing means such as an enlargement which positively spaces the handle from the coupling unit and thereby spaces the free end of the lever or handle from the coupling unit by a distance which defines a freely engageable multiple finger engaging portion defined by an inner surface substantially concentric to said adjacent coupling sections between said handle and said coupling and permits convenient manual gripping of such free end. This permits not only relatively convenient opening and closing of the coupling unit, but relatively safe operation without the danger of finger damage. In addition, the cooperating spacing means is preferably provided with overlapping sections on the handle and adjacent coupling number, having releasable means, such as aligned openings in the overlapping sections to receive a locking pin. This will prevent accidental opening of the coupling of the flow system by unintended engagement with the handle as well as due to vibration under operating conditions and the like. In a preferred and particularly novel construction the operating handle extends over the coupling unit with a central integrally formed portion extending inwardly as an enlargement such that with the handle in the completely closed position the enlargement rests on the adjacent coupling section. The enlargement projects inwardly between a pair of integral flanges on the coupling section member. The handle enlargement and the flanges are provided with aligned openings in the closed position to receive a locking pin.

The toggle assembly of the coupling unit preferably includes means for adjusting the relative position of a toggle link to permit the varying of the locking force. Thus, in a preferred construction the toggle assembly includes a bolt like member pivotally attached to the one segment. An adjustable nut is attached to the outer end of the bolt and pivotally interconnected to the handle member to permit adjustment of the relative position of the handle member on the bolt. The lever includes integral cam surfaces corresponding to cam surfaces on the second segmental coupling member to provide a cam action in response to engagement and pivotal movement of the handle.

Further, in accordance with a further teaching of the present invention particularly for concrete placement applications and the like, the coupling is formed with similar hemispherical section having opposed radial end faces. In accordance with the present invention, a hinge structure interconnects the one end to positively maintain a selected spacing between the opposing faces such that small aggregate and other material such as encountered in concrete will not interfere with the reliable actuation of the coupling member. This maintains the creation and provision of the clamping forces on the hinged structure without creating unbalanced forces as the result of material within the mating faces.

The present invention has thus been found to provide a relatively rapid acting and positively locked coupling. The coupling is particularly advantageous when applied to concrete placement and the like where it is desired to permit the rapid connection and disconnection of the pipe sections through manual operation or release of the coupling units.

BRIEF DESCRIPTION OF DRAWING

The drawing furnished herewith illustrates the preferred construction of the present invention in which the above advantages and features are clearly disclosed as well as others which will be readily understood from the following description.

In the drawing:

FIG. 1 is a side elevational view of a coupling unit constructed in accordance with the present invention;

FIG. 2 is an end elevational view of the coupling unit shown in FIG. 1 showing the interconnecting fixed hinge;

FIG. 3 is an opposite end view of the coupling unit shown in FIG. 1 illustrating the toggle type connector, and with parts of the coupling unit broken away and sectioned to show certain detail of construction; and FIG. 4 is a pictorial view showing the coupling unit of FIGS. 1 through 3 in the open position.

DESCRIPTION OF ILLUSTRATED EMBODIMENT

Referring to the drawing, and particularly FIGS. 1 and 3, a coupling unit 1 constructed in accordance with the teaching of the present invention is shown interconnecting a pair of metal conduits or pipes 2 and 3 in end-to-end relation to establish a continuous flow path therebetween. The illustrated coupling unit 1 is a metal assembly including a pair of hemispherical or semi-circular sections or members, the opposite end faces of which are generally radial planar surfaces such that with the coupling in the closed position as shown in FIG. 1 an essentially complete circular enclosure is provided about the adjacent ends of the pipes 2 and 3. The sections 4 and 5 are formed with similar cross-sections and in particular are of a generally inverted U-shaped construction with the inner edges of a somewhat reduced thickness to define radial clamping lips 6 which project inwardly into clamping recesses or grooves 7 formed in the exterior surface of the pipes 2 and 3. In addition, a circular sealing gasket 8 overlies the pipe ends within the inverted coupling members 4 and 5 in accordance with known constructions to provide a firm fluid and liquid tight joint. Thus with the coupling unit 1 in closed position as shown in FIG. 1, the physical interengagement of the coupling members with the housing section provides a firm physical interconnection therebetween to maintain the location of the pipe sections relative to each other, and the gasket 8 provides a fluid tight joint. The invention thus may be advantageously applied to a concrete placement system where steel pipes or the like have the ends appropriately formed for connection by the coupling unit 1.

Turning particularly to FIG. 1, the coupling unit 1 of the present invention and particularly the members 4 and 5 are interconnected at one end by a hinge pin 9 and at the opposite end by a releasable toggle assembly including a manually operable handle 10 to permit release and opening of the coupling unit to the position shown in FIG. 4.

In accordance with the illustrated embodiment of the invention, the member 4 includes a pair of integrally formed bearing ears 11 having aligned openings through which the pin 9 projects. The ears 11 are integrally formed as a part of the member 4 such as by casting or the like and are connected thereto by a continuous strengthening portion which extends outwardly from the exterior peripherial portion of the member 4 to establish a relatively high strength bearing member. The opposite section or member 5 includes a similar hinge bracket portion 12 which projects from the exterior surface of the member 5 between the ears 11. The bracket portion 12 has a corresponding opening through which the pin 9 extends to establish the hinged connection.

The hinge pin 9 is located on the common plane through the center of the coupling unit 1 and particularly on a common plane between the two coupling members 4 and 5, as most clearly illustrated in FIGS. 1 and 2. Further, the members 4 and 5 are slightly less than a full half circle such that the planar surfaces 13 which project inwardly from the hinged portion are spaced slightly from each other to define a distinct circumferential spacing 14 between the members 4 and 5 in the closed clamping position, such as shown on FIG. 1. Thus, the free space 14 will accept the relatively small aggregate and similar foreign matter which cannot be conveniently brushed from within the joint so as to not interfere with the closing and opening of the coupling unit. Further, any material within the gap will partially disintegrate within the relatively large space and prevent creation of abnormal and undesirable stresses. The closing of the coupling unit may thus be obtained in a rapid and reliable manner.

The coupling unit 1 is opened and closed by the pivoting of the handle 10 of the toggle assembly interconnecting the free ends of the coupling members 4 and 5, as follows.

The lower member 4 includes a pair of radially projecting ears or brackets 15 which project radially outwardly from the opposite or free end of the member 4. The brackets 15 are provided with aligned openings within which a pivot pin 16 is secured. A toggle bolt 17 is journaled on the pin 16 between the brackets 15. A coupling cap 18 is secured to the opposite end of the bolt 17 and includes a lateral pivot opening 19 through which a second pivot pin 20 passes. The handle 10 has a bifurcated cam end with a pair of cam arms 22 which project over the member 18. The arms 22 have corresponding aligned openings aligned with opening 19 with the pin 20 passing therethrough and are joined by an integral base 23 to pivotally attach the handle 10 to the toggle bolt 17 through the cap 18. The cap 18 is adjustably secured to the bolt 17 as by the threaded connection 21 to permit adjustment of the effective length between the pivot pins 16 and 20.

The cam arms 22 cooperate with corresponding cam surfaces 24 formed on a pair of radial brackets 25 projecting outwardly from the free end of coupling member 5. Thus, the brackets 25 are shown integrally formed on the opposite or free end of the member 5 and project radially outwardly generally coextensively of the brackets 15. The outer portion of each bracket 25 is formed with a curved depression defining a cam surface 24 cooperating with the correspondingly curved shaped end of the cam arms 22. The cam surface 24 is located slightly inwardly of the axis of the toggle pin 16 with member 5 in the closed position. Consequently, when the handle 10 is pivoted to the closed position as shown in FIG. 1, the axis of the pin 20 moves inwardly of the axis of the pin 16 to provide a firm interconnecting latch as the result of the bearing engagement of the cam surfaces on the brackets 25 and the ends of cam arms 22 of the handle 10.

In accordance with the illustrated embodiment of the invention the handle 10 extends outwardly and circumferentially of the member 5 as an integral solid member from the interconnecting base 23 of the cam arms 22. The illustrated handle 10 which extends over the member 5 is of a substantially lesser thickness than the member 5 and is generally curved in accordance with the configuration or diameter radius of the member 5. The central portion of the handle 10 is formed with an inwardly projecting enlargement or lug 28 which extends inwardly between a pair of upstanding flanges 29 integrally formed on the exterior of the member 5. Lug 28 is selected to engage the exterior surface of the member 5 with the pin 20 in the toggle locking position and thus to the left of the center of the axis of the toggle pin 16 as shown in FIG. 1. It thus permits complete closure of the toggle unit. The enlargement or lug 28, however, positively spaces the outer extension of the handle 10 which thus defines a manually accessible handle 30 spaced from the exterior of the member 5 as at 31. The lug 28 is selected of such a size to establish a sufficiently large space 31 which will permit the insertion and ready and free movement of an operator's fingers into the space with the handle 10 in the completely closed position. This then prevents possible clamping of the fingers between the handle 30 and section 5 and further provides an appreciable gripping area for manually opening of the coupling unit.

The depending lug 28 and the upstanding flanges 29 are preferably provided with correspondingly sized and aligned openings 32 with the handle 10 in the closed position. A latch pin 33 may be projected through the aligned opening 32 to positively lock the handle 10 in the closed position thereby preventing accidental opening of the coupling either through accidental engagement with the handle 30, by vibration or the like as a result of flow through conduits 2 and 3.

If the exposure of the outer most end of handle 30 is considered undesirable, it can of course be extended inwardly as shown in phantom line such that in the closed position the free closely approaches the outwardly projecting hinge lug or portion 10 of member 5. This would, of course, minimize the danger of hooking the handle 30 and accidentally tending to open the toggle assembly, if, for example, the pin 33 is not employed, has been inadvertently omitted, or the like.

In the operation, the pipes 2 and 3 are laid in proper end-to-end relationship with the gasket located over the pipe, for example as illustrated in FIG. 2. The coupling assembly is in the open position, as shown in FIG. 4. The housing member 5 is now swung about its hinge pin 9 to rest upon the pipe section with the brackets 25 aligned with the brackets 15. The handle 10 is moved upwardly to carry the bolt 17 between the aligned brackets 15 and 25. The cam ends of the cam arms 22 are engaged with the cam surfaces 24 and the handle 10 is then pivoted or swung about the pin 20. Thus, as viewed in FIG. 1 the handle 10 would be pivoted in a counterclockwise direction about the pin 20. It would first stress the housing causing them to move downwardly as a result of the spacing of the pins 16 and 20. The continued movement would cause the members to move 4 and 5 toward each other and tightly engage the pipes to thereby provide a firm physical interlock therebetween. It would simultaneously compress the gasket to produce a liquid and fluid type joint.

The handle 10 is completely pivoted to the closed position, the lug 28 engages the exterior surface of the member 5 with the openings 32 aligned. The locking pin 33 can then be conveniently passed through the openings to firmly and positively interlock the toggle in the closed position.

In the closed position as previously noted, the opposing ends of the members 4 and 5 are spaced as shown at 14 adjacent the hinge pin 9 to prevent interference with the closing of the coupling unit by foreign matter such as concrete aggregate which may have entered in between the members in use. This is particularly significant in connection with concrete placement and the like where aggregate foreign matter is present and readily finds its way into areas such as the hinge joints.

When the pipes 2 and 3 are to be released, the handle portion 30 may be conveniently grasped and the necessary opening force applied directly to the handle 10.

Applicants have found that the present invention provides a very reliable and firm interconnection of the pipe sections with the opening and closing of the coupling assembly being conveniently performed by any manual operator.

The present invention thus provides a reliable and rapidly actuated coupling for interconnecting conduit members and particularly self-supporting conduit members for concrete placement lines and the like.

Various modes of carrying out the invention are contemplated as being within the scope of the following claims particularly pointing out and distinctly claiming the subject matter which is regarded as the invention.

I claim:

1. A coupling unit for interconnecting of a pair of pipe sections comprising a plurality of coupling sections interconnected to define a cylindrical enclosure in closed position for encircling the adjacent ends of a pair of conduit means, said sections being interconnected to each other and including at least one hinged joint permitting relative pivotal movement of the sections to the opposite sides of the hinge joint between an open expanded position for insertion and removal of the conduit means and the closed circular position, a releasable interconnecting two piece latch means interconnected to a pair of adjacent sections opposite said hinge joint and having an interconnecting handle pivoted between a coupling release position and a coupling close position to establish said closed circular position with a relatively high closing pressure, said handle having a generally arcuate configuration and pivotally mounted adjacent one end and extending circumferentially from said latch means about the coupling sections in the close position with the outer end of the handle located substantially in excess of one-quarter of the circumference from said latch means, said handle and aligned coupling sections including spacing means extending radially of the coupling sections and engaged with the handle pivoted to the closed position, said spacing means being located in substantial spaced relation to the free outer end of said handle and to said latch means and locating said outer end in substantial spaced relation to the sections to define a freely engageable multiple finger engaging portion defined by an inner surface substantially concentric to the adjacent coupling sections between said handle and said coupling.

2. The coupling unit of claim 1 wherein said spacing means includes radially overlapping members secured one to said handle and one to the coupling section, and locking means releasably connected to said overlapping members to hold the handle in the close position.

3. The coupling unit of claim 1, wherein said plurality of coupling sections includes a pair of semi-circular sections connected by said hinge joint at one end, said latch means including a first member pivotally connected to a first of said sections and a cam member connected to the second of said sections, said handle being connected to said first pivotally mounted section and adopted to engage said member of the second section, said handle being pivoted to said first member and having a cam portion selectively engageable with said cam member and pivoting on said cam member between said close and release positions.

4. The coupling unit of claim 1 wherein said handle includes an integral enlargement extending inwardly from the handle toward the coupling section and engaged therewith with the handle pivoted to the closed position to thereby define said spacing means.

5. The coupling unit of claim 4 wherein said handle extends circumferentially about the coupling for a distance such that the handle spans substantially one-half of the coupling unit, said enlargement being located generally centrally of said handle.

6. The coupling unit of claim 5 wherein said coupling section adjacent said handle includes an upward extending bracket aligned with said enlargement in the closed position, said flange and said enlargement having corresponding aligned openings in the closed position to permit insertion of a releasable coupling pin and positively locking of the handle in the closed position.

7. The coupling unit of claim 1 wherein said plurality of coupling sections includes a pair of similar semi-circular members having opposed planar radial circumferential end faces, one end of said sections being interconnected by said latch means, the opposite end of said segments being pivotally interconnected by said hinged joint and including a hinge pin lying in the common plane between the two sections, said hinge pin being mounted to positively prevent engagement of the opposing end faces of the sections adjacent such hinge pin.

8. The coupling unit of claim 1 wherein said latch means includes a pin member pivotally secured to the first coupling and having a locking position extended past said cam portion, a cam member being secured to said second coupling section and including an exterior circumferential cam surface, said handle being pivotally secured to the outermost end of said pivotally mounted pin member and including a cam arm engageable with said cam portion with pivotal movement relative to said cam portion selectively releasing and closing of the coupling sections, said handle extending circumferentially about the coupling for a distance such that the handle spans substantially one-half of the coupling unit, said spacing means being an enlargement on said handle being located generally centrally of said handle.

9. The coupling unit of claim 8, wherein said coupling section adjacent said handle includes an upward extending bracket aligned with said enlargement in the close position of the handle, said flange and said enlargement having corresponding aligned openings in the closed position to permit insertion of a releasable coupling pin and positively locking of the handle in the closed position.

* * * * *